Oct. 24, 1967     H. BEIK ET AL     3,348,503

BAKERY APPARATUS

Filed June 15, 1965     3 Sheets-Sheet 1

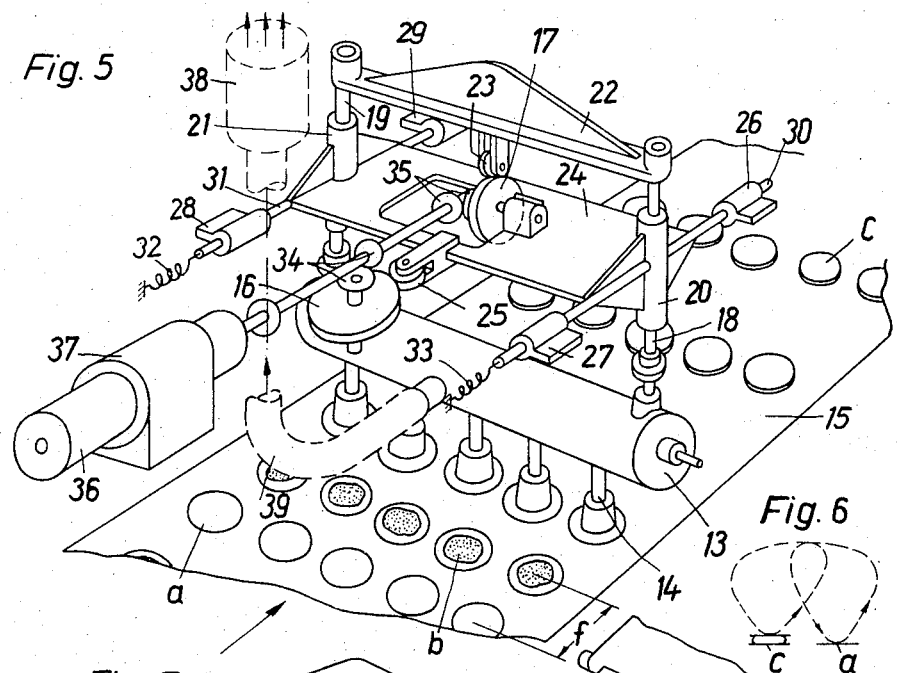
Fig. 5
Fig. 6
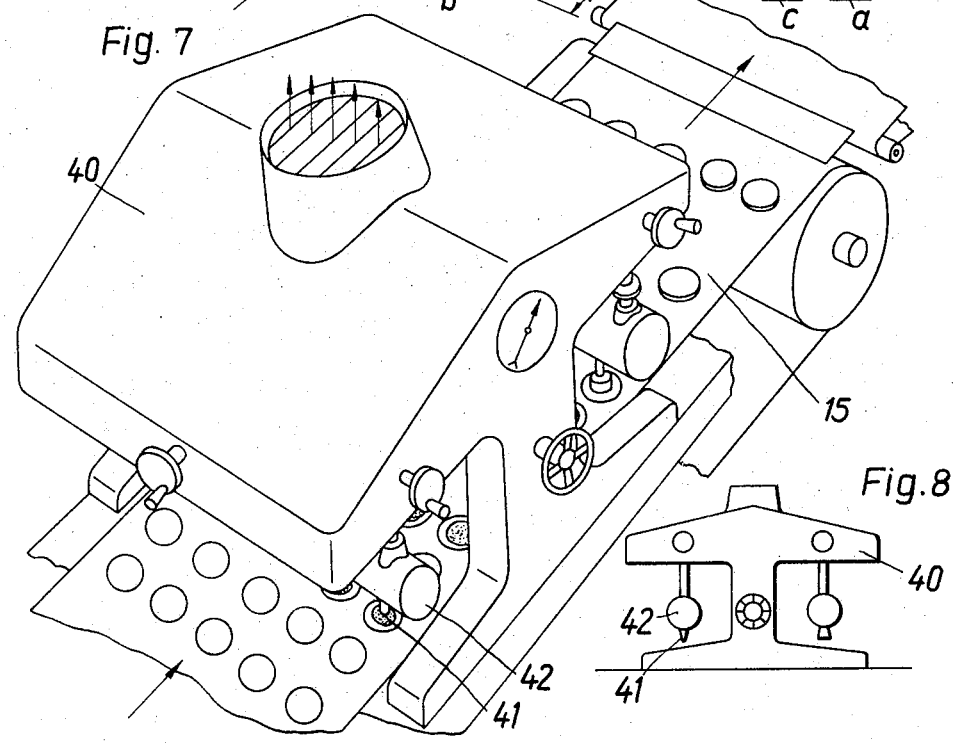
Fig. 7
Fig. 8

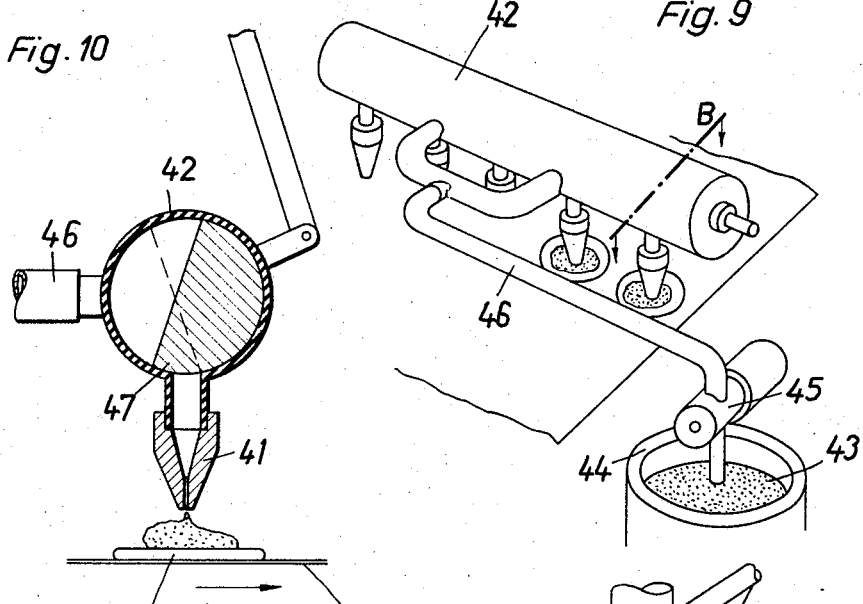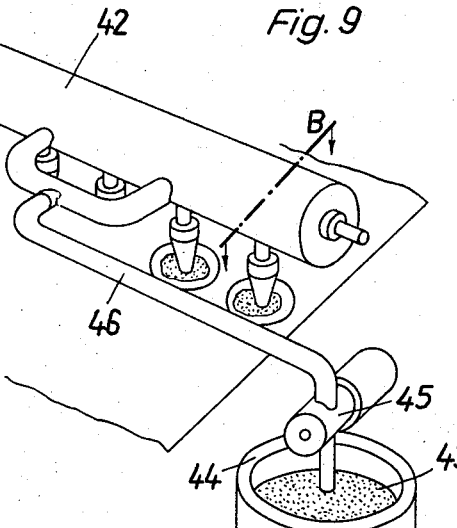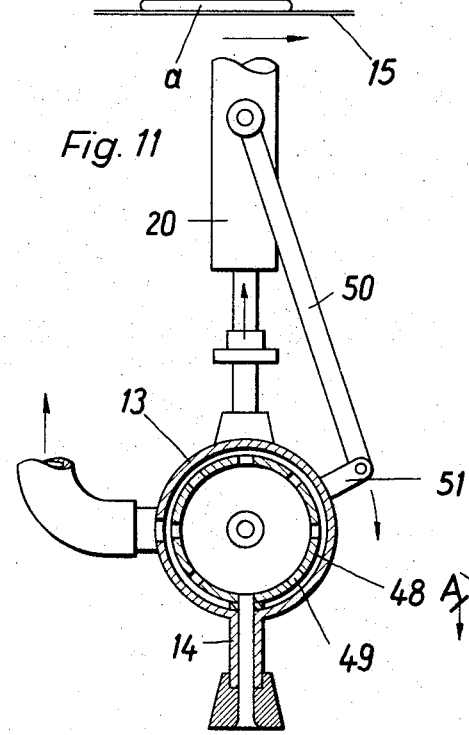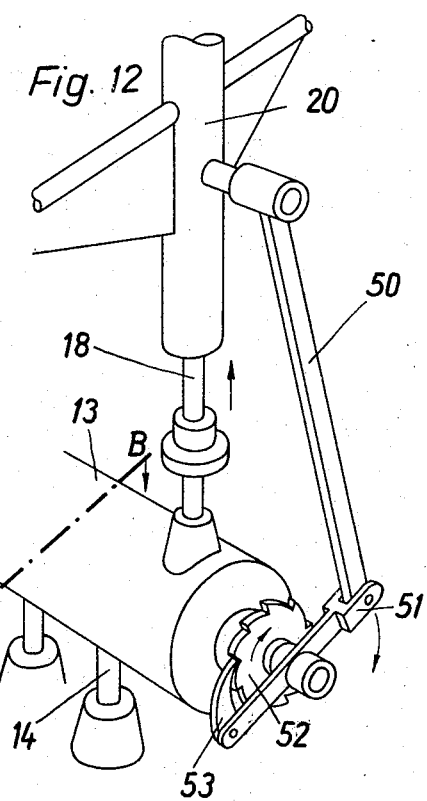

3,348,503
BAKERY APPARATUS
Hermann Beik, Hannover, and Georg Florian, Kaltenweide, Germany, assignors to Werner Bahlsen, Hannover, Germany
Filed June 15, 1965, Ser. No. 464,052
Claims priority, application Germany, June 23, 1964,
B 77,378
11 Claims. (Cl. 107—1)

This invention relates to an apparatus whereby a pair of cake elements are brought into superposed relationship, such cake elements being carried in uniform sequence on a conveyor, more particularly on an oven belt or conveyor belt coming from an oven.

In prior art methods of topping cakes or the like, cake elements are stacked in magazines, withdrawn singly from the same, and treated in the topping station. This method requires very uniform or large pieces of pastry or the like.

It is also known to connect such magazine-type topping devices to an oven belt or similar continuous conveyor. In such cases, two or four overlapping rows of cake elements are stored in magazines, from which they are withdrawn, taken beneath the cream applicator, have cream applied and are then topped, all these operations being carried out at high speed. This method entails a relatively high speed of operation of the mechanical parts of the topping mechanism, so that this method is unusable where the creams used are of relatively thick consistency.

The object of the invention is to provide a topping device which is of simpler construction than the prior art magazine-type topping devices and which while giving the same overall output makes use of topping components operating at lower speeds.

To this end, according to the invention, a plurality of suction nozzles is provided, such nozzles being interconnected in a row parallel to the rows of cake elements, the distances between the nozzles being equal to the distances between the cake elements in the parallel rows, such nozzles being arranged for joint reciprocation transversely of the direction of their row in relation to the conveyor bearing the cake elements and being lowered to a position close to the conveyor at the end points of their reciprocating movement, said nozzles being so controlled in synchronism with the conveyor movement that on each lowering movement they meet adjacent cake element rows and suction is applied to the nozzles in one of the two directions of movement so that they each pick up a row of cake elements and deposit them on the adjacent row. The rows extend transversely of the direction of conveyance and each row of nozzles picks up a complete transverse row of cake elements. The nozzle row is advantageously adapted to reciprocate between successive cake element rows. According to the invention, however, the nozzle rows may be disposed in the direction of conveyance, in which case half as many nozzle rows are disposed side by side in the transverse direction as there are longitudinal rows of cake elements. The turnover movement of the nozzle rows then takes place between adjacent longitudinal rows of cake elements.

According to a particular feature of the invention, the cake elements may be conveyed continuously. In that case, the movement of the conveyor is superimposed upon the movement of the nozzles in those parts of their movement during which they pick the cake elements up from the conveyor and put them down again. This means that there cannot be any relative movement in the horizontal direction between the conveyor and the suction nozzles during periods when both the conveyor and the suction nozzles can communicate with a cake element.

In the case of the topping of cake elements, the conveyor for the cake elements may be the oven belt itself.

Specific embodiments of the invention will now be described by way of example with reference to the accompanying drawings, in which:

FIG. 5 shows the mechanism for obtaining the suction nozzle movement;

FIG. 6 shows the path of movement of the suction nozzles for the lifting and topping operations;

FIG. 7 shows the complete topping machine in combination with the cream applicator;

FIG. 8 is a side elevation corresponding to FIG. 7, to a reduced scale;

FIG. 9 shows the cream supply to the cream applicator nozzles;

FIG. 10 is a section on AB through the suction nozzles and the rotary valve;

FIG. 11 is a section on the line AB through the suction nozzle tube in FIG. 12, and FIG. 12 is a perspective view of the suction nozzle tube and movement mechanism.

The parts of the system according to the invention move at relatively low speeds, 18 to 30 cakes being topped simultaneously depending upon the cake diameter and oven belt width (for oven belt widths of 1 to 1.2 metres for example).

Drum ovens employing steel belts are generally used in the industrial manufacture of cakes and pastry. The raw cake dough is shaped ahead of the oven and conveyed by suitable means to the steel oven belt (see FIG. 1). The cakes are cooked as they travel through the drum oven.

For the manufacture of sandwich-type cakes, which consist for example of two identical pieces of pastry or the like with a cream filling between them, cream is applied alternately to every other row of cake elements $a$ (FIG. 1) on the oven belt. Provided that the sequence of cakes is maintained, this can, of course, alternatively be done after the oven belt. In such cases the rows of cakes would be moved, for example, by means of an aligning strip from the oven belt onto a following conveyor belt to maintain the sequence.

A row of suction nozzles 5 is disposed transversely of the direction of movement and each nozzle picks up the uncreamed row of cake elements $b$ from the belt 1 by appropriate control of the nozzles 5 and timing of the suction, and deposits it on the row of cake elements $a$ to form a topped row of cakes $c$. The movement of the suction nozzles and the starting and stopping of the suction are adapted to the speed of the oven belt and the sequence of cake elements. Advantageously, the suction nozzles are jointly secured to an air pipe 6. The latter is moved, for example via levers 7 and 8 according to the required sequence of movements, as will be described hereinafter. Immediately after topping, the topped cakes $c$ can be taken on a following conveyor belt through a cooling system and to the packing station.

Figure 3:
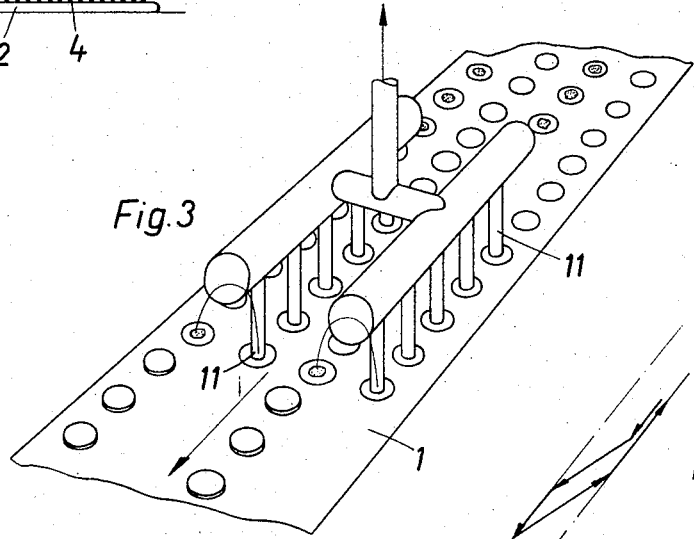
FIG. 3 shows an arrangement of suction nozzles in the direction of movement of the cake conveyor belt.
Figure 4:
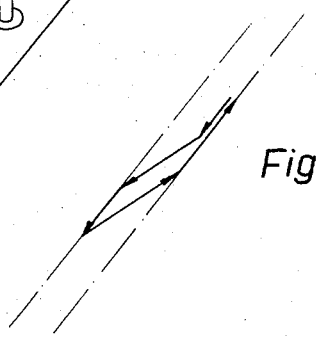
FIG. 4 is a movement diagram for the suction nozzles shown in FIG. 3.

The rows of nozzles can of course be disposed in the direction of movement of the belt 1 (FIG. 3). In this case, for example, nozzle rows 11 each lift a number of cake elements from the rows of uncreamed cake elements on the oven belt 1 and deposit them on the corresponding creamed cake elements of the next rows. The movement of the nozzles will be apparent from FIG. 4.

Figure 1:
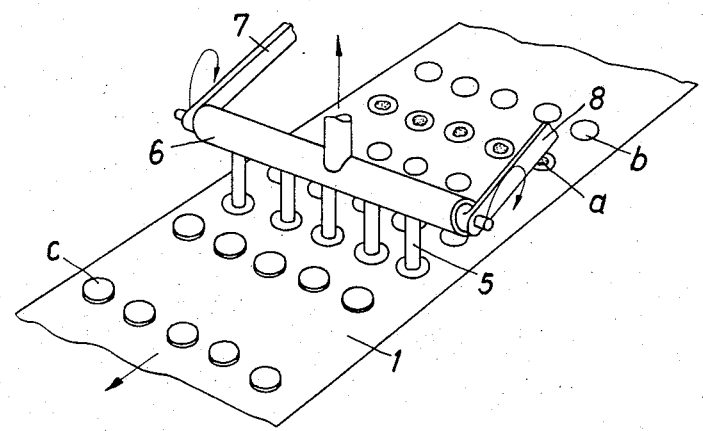
FIG. 1 shows an arrangement of suction nozzles for topping transversely of the direction of movement of a cake conveyor belt.
Figure 2:
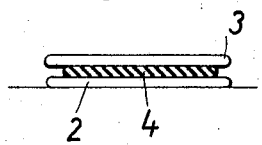
FIG. 2 shows two topped cake elements with a layer of cream between them.

Apparatus for performing the method according to FIG. 1 will be described and explained in detail hereinafter.

The air pipe 13 with the nozzles 14 is moved as shown in FIG. 6 to correspond with the speed of the oven belt 15 and the spacing $f$ between the rows of cake elements. This movement of the suction nozzles consists of the horizontal movement of the oven belt and the lifting and topping movement and the reciprocating movement from one row to the next and is controlled in the apparatus, for example, by two cam discs 16 and 17, the former being provided for the horizontal movement and the latter for the lifting and topping movement.

The air pipe 13 is held at both ends by two rods 18 and 19 which are guided in parallel relationship in mountings 20 and 21. The two rods 18 and 19 are connected above the mountings by a cross-member 22. A cam follower 23 is provided thereon and follows the movements of the cam disc 17 for the vertical movement. The cam disc 17 is mounted on a horizontally movable plate 24 to which the mountings 20 and 21 for the vertical movement are also secured.

A cam follower 25 co-operating with the cam disc 16 for the horizontal movement is also provided on the plate 24. The shaft of cam disc 16 is fixed in the casing (not shown). The plate 24 is also held by mountings 26 to 29 secured to the casing. These mountings guide the guide rods 30 and 31 secured to the plate so that the latter can perform only horizontal movements in the direction of the oven belt.

The plate 24 is continuously pressed against the cam disc 16 via the cam follower 25 by means of springs 32 and 33 secured to the guide rods 30 and 31. The cam discs 16 and 17 are driven by pairs of bevel gears 34 and 35, one bevel gear of the pair 35 being disposed to be horizontally movable on the drive shaft via a wedge guide. The cam discs 16 and 17 are jointly driven by the motor 36 via the transmission 37. A blower 38 is provided for the suction and is connected to the air pipe via a flexible hose connection 39. The movement mechanism for the cream application may be constructed in the same way. The movement cycle is only half the value however. The cam discs may also be different. This device may be disposed mirror-image fashion in relation to the device shown in FIG. 5, in a common casing 40. Instead of the suction nozzles, cream nozzles 41 (FIGS. 7 and 8) are provided on a rotary valve 42. The cream 43 is advantageously delivered from a container 44 (FIG. 9) to the rotary valve 42 by a pump 45 (which may be driven by an electric motor for example) and a flexible conduit 46. The cream is metered by a rotary piston 47 (FIG. 10).

In the position illustrated, the nozzle feeds are closed, and the open position is shown in broken lines. The rotary movement of the piston is obtained by mechanical elements (not shown). The suction for the suction nozzles is controlled by a rotary cylinder 48 (FIG. 11) formed with bores 49 which, depending upon their position with respect to the opening of the nozzle connection 14, shut off or apply the suction for the nozzle. Changes in the position of the rotary cylinder 48 occur on each upward movement of the nozzles, since the levers 50 and 51 articulated on the fixed part 20 and on the spindle of the rotary cylinder 48 rotate the latter via the ratchet wheel 52 and pawl 53 (FIG. 12). The rotary movement of the piston 47 for the cream application is controlled similarly, except that no ratchet wheel 52 is provided.

We claim:

1. Apparatus for bringing pairs of cake elements into superposed relationship, which cake elements are carried in spaced apart parallel rows on a moving conveyor, comprising a plurality of suction nozzles, which nozzles are interconnected in a row parallel to the rows of cake elements and are spaced apart at distances equal to the spacing of said rows of cake elements, means for jointly reciprocating said nozzles transversely of the direction of their row with respect to the conveyor and arranged to be lowered to a position close to the conveyor at the end points of said reciprocation, control means to control said nozzles in synchronism with the conveyor movement so that on each said lowering movement they meet adjacent cake element rows, and means for applying suction to the nozzles in one of the two directions of movement so that they each pick up a row of cake elements and deposit them on an adjacent row.

2. Apparatus according to claim 1, characterised in that the rows extend transversely of the direction of conveyance and each row of nozzles picks up a complete transverse row of cake elements.

3. Apparatus according to claim 1, characterised in that the cake elements are conveyed continuously and the movement of the conveyor is superimposed upon the movement of the nozzles in those parts of their movement during which they pick the cake elements up from the conveyor and put them down again.

4. Apparatus according to claim 1, characterised in that the nozzles are mounted in a vertical guide and a horizontal guide so as to be controllable independently of one another.

5. Apparatus according to claim 1, characterised in that jointly driven cam discs are provided for horizontal and vertical control of the nozzles.

6. Apparatus according to claim 1, characterised by means for transmitting the lifting and lowering movements to a control valve for operation of the nozzle suction.

7. Apparatus according to claim 6, characterised in that such means consist of a ratchet wheel on the valve shaft and a link moved positively by the nozzle movement, such link bearing the pawl for the ratchet wheel.

8. Apparatus according to claim 7, characterised in that the valve consists of a hollow cylinder formed with a number of apertures corresponding to half the ratchet wheel pitch, such cylinder passing an aperture leading to the nozzles in the direction of the suction as said cylinder rotates.

9. Apparatus according to claim 1, characterised in that a device for applying cream to the bottom cake elements is provided with a number of nozzles corresponding to the suction nozzles, the former being connected in parallel to the latter and operating at half the speed by appropriate movement control means.

10. Apparatus according to claim 9, characterised by a synchronous drive for the conveyor, cream applicator device and topping device.

11. Apparatus according to claim 1, characterised in that the conveyor is an oven belt.

References Cited
UNITED STATES PATENTS

| | | | |
|---|---|---|---|
| Re. 25,072 | 10/1961 | Monaco | 107—1 |
| 2,817,306 | 12/1957 | Oakes | 107—1 |
| 2,868,141 | 1/1959 | Griner | 107—45 X |
| 3,031,906 | 5/1962 | Holman | 214—1 X |
| 3,288,088 | 11/1966 | Leedy | 107—54 |

WALTER A. SCHEEL, *Primary Examiner.*

A. O. HENDERSON, *Examiner.*